United States Patent [19]

Schuchman et al.

[11] Patent Number: 5,726,893
[45] Date of Patent: Mar. 10, 1998

[54] CELLULAR TELEPHONE WITH VOICE-IN-DATA MODEM

[75] Inventors: Leonard Schuchman, Potomac, Md.; Ronald Bruno, Arlington, Va.; Charles Moses, Catonsville, Md.

[73] Assignee: Stanford Telecommunications, Inc., Reston, Va.

[21] Appl. No.: 348,081

[22] Filed: Nov. 23, 1994

Related U.S. Application Data

[63] Continuation of Ser. No. 079,810, Jun. 22, 1993, abandoned, which is a continuation-in-part of Ser. No. 992,892, Dec. 17, 1992, Pat. No. 5,365,450.

[51] Int. Cl.$^6$ .................. G06G 7/78; G01S 3/02; H03C 1/00
[52] U.S. Cl. ................ 364/449.7; 364/449.9; 364/449.8; 364/449.1; 342/457; 342/450; 375/222; 379/93; 379/98; 390/493
[58] Field of Search ................ 364/443, 444, 364/449, 450, 454, 460, 459, 726; 342/457, 458, 387, 357, 356, 463–465; 340/572, 990, 995, 998; 455/33.1, 43, 93–95, 38.5, 67.6, 152.1, 54.1, 306–311, 56.1, 53.1, 33.3, 235.1, 249.1; 379/58, 60, 59, 410, 406, 496, 497, 93, 98; 348/16–18; 375/219, 222, 377, 324, 334; 370/329, 330, 336, 343, 344, 380, 494, 493, 340, 341, 495

[56] References Cited

U.S. PATENT DOCUMENTS

| Re. 34,036 | 8/1992 | McGeehan et al. | 455/71 |
|---|---|---|---|
| 1,968,106 | 7/1934 | Thierbach | 455/70 |
| 2,613,279 | 10/1952 | Hurault | 370/76 |
| 3,436,487 | 4/1969 | Blane et al. | 370/76 |
| 3,715,758 | 2/1973 | Sender | 343/112 R |
| 3,781,794 | 12/1973 | Morris | 340/146 |
| 3,795,877 | 3/1974 | Poole | 333/173 |
| 3,889,264 | 6/1975 | Fletcher | 343/105 R |
| 3,938,045 | 2/1976 | Mathwich | 325/163 |
| 4,054,088 | 10/1977 | Dalabakis et al. | 343/112 R |
| 4,225,967 | 9/1980 | Miwa et al. | 455/68 |
| 4,229,620 | 10/1980 | Schaible | 342/457 |
| 4,425,665 | 1/1984 | Stauffer | 375/9 |
| 4,445,118 | 4/1984 | Taylor et al. | 342/457 |
| 4,512,013 | 4/1985 | Nash et al. | 370/69.7 |
| 4,642,633 | 2/1987 | Dunkerton et al. | 340/825.76 |
| 4,871,987 | 10/1989 | Kawase | 332/100 |
| 4,891,650 | 1/1990 | Scheffer | 342/457 |
| 4,979,188 | 12/1990 | Kotzin et al. | 375/254 |
| 5,014,206 | 5/1991 | Scribner et al. | 364/449 |
| 5,032,845 | 7/1991 | Velasco | 342/457 |
| 5,043,736 | 8/1991 | Darnell et al. | 342/457 |
| 5,045,861 | 9/1991 | Duffett-Smith | 242/457 |
| 5,103,459 | 4/1992 | Gilhousen et al. | 375/205 |
| 5,155,689 | 10/1992 | Wortham | 364/449 |

(List continued on next page.)

OTHER PUBLICATIONS

Wittneben: An efficient baseband modem technique for data transmission over analog FM links, IEEE May 1992.

Chan et al: Multimode high performance HF modem, IEEE Apr. 1992.

Schuchman et al: Applicability of an augmented GPS for navigation in the national airspace system, IEEE Nov. 1989.

Voice Too™ Modem by OPTEL Communications no date.

Primary Examiner—Jacques Louis-Jacques
Attorney, Agent, or Firm—Jim Zegeer, Esq.

[57] ABSTRACT

A GPS system has a plurality of satellites transmitting time and location data over radio frequency signals which enable a mobile GPS receiver on the ground to determine its position, includes a source of satellite data message block containing the ephemeris and time modes of the GPS satellites which is independent of the satellites, and an independent cellular telephone channel having a voice channel, a data-in-voice modem including a notch filtering circuit in the voice channel (transmits and receive) and circuits for inserting and retrieving data in and from the notch for accessing said satellite data message block and controller means connecting said satellite message data block to said mobile GPS receiver.

6 Claims, 4 Drawing Sheets

U.S. PATENT DOCUMENTS

| | | | |
|---|---|---|---|
| 5,173,710 | 12/1992 | Kelley et al. | 342/463 |
| 5,202,829 | 4/1993 | Geir | 364/443 |
| 5,214,641 | 5/1993 | Chen et al. | 370/69.1 |
| 5,218,367 | 6/1993 | Sheffer et al. | 342/457 |
| 5,218,618 | 6/1993 | Sagrey | 375/1 |
| 5,223,844 | 6/1993 | Mansell et al. | 342/357 |
| 5,225,842 | 7/1993 | Brown et al. | 342/357 |
| 5,280,295 | 1/1994 | Kelley et al. | 342/463 |
| 5,295,156 | 3/1994 | Heep et al. | 379/98 |
| 5,299,132 | 3/1994 | Wortham | 364/449 |
| 5,300,936 | 4/1994 | Izadian | 343/700 |
| 5,327,144 | 7/1994 | Stilp et al. | 342/387 |
| 5,361,399 | 11/1994 | Linquist et al. | 455/56.1 |
| 5,375,166 | 12/1994 | Odaohara | 379/98 |
| 5,398,190 | 3/1995 | Wortham | 364/449 |
| 5,410,541 | 4/1995 | Hotto | 370/76 |
| 5,418,537 | 5/1995 | Bird | 342/357 |
| 5,418,849 | 5/1995 | Cannalire et al. | 379/410 |

CELLULAR TELEPHONE WITH VOICE-IN-DATA MODEM

This is a continuation of application Ser. No. 079,810, filed Jun. 22, 1993, which was abandoned upon the filing hereof, which application is a continuation-in-part of application Ser. No. 07/992,892 filed Dec. 17, 1992 for "HYBRID GPS/DATA LINK UNIT FOR RAPID, PRECISE AND ROBUST POSITION DETERMINATION" now U.S. Pat. No. 5,365,450.

This invention relates to method and apparatus for enabling rapid and accurate measurement of vehicle position, and more particularly to the global positioning system (GPS) for achieving precise position locating in the urban canyon and other line of sight obstructed environments. It further relates to supplying the required data link over a cellular phone or other channel in order to support the measurement of GPS position, and to relay the resulting position measurements over the phone system to service providers (such as towing companies) that need to know vehicle position in order to provide service.

BACKGROUND AND BRIEF DESCRIPTION OF THE INVENTION

Most modern GPS receivers employ the GPS satellite almanac and rough information on current time and position to attempt to acquire signals of visible GPS satellites by searching in a limited number of frequency bins over a time uncertainty hypothesis of one millisecond, the repetition interval of the GPS C/A codes. In general, the entire sequence of events for arriving at a estimate of position location is in accordance with the following sequence of events:

1. Detection of a satellite PN code in a frequency bin,
2. Acquisition and tracking of the carrier frequency,
3. Acquisition and tracking of the data transitions and data frame boundary,
4. Reading broadcast data for the satellite ephemeris and time model (the 900 bit Satellite Data Message),
5. Completing steps 1–4 (serially or in parallel) for all in-view satellites,
6. Making pseudorange measurements on these signals in parallel, and
7. Computation of position using the pseudorange measurements and satellite data.

The time required to accomplish these steps in a conventional GPS receiver will vary depending upon the assumed starting point of the GPS receiver. It is useful to define three reference starting points for a GPS receiver. These are as follows:

Cold Start: Where the receiver has no GPS almanac. The GPS almanac is a 15,000 bit block of coarse ephemeris and time model data for the entire GPS constellation. Without an almanac, the GPS receiver must conduct the widest possible frequency search to acquire a satellite signal. In this case, signal acquisition can take several minutes to accomplish because a large number of frequency cells must be searched that takes into account the large uncertainties in satellite Doppler as well as GPS receiver oscillator offset. In addition, acquisition of the GPS almanac will take at least 12½ minutes of listening to the broadcast of a single GPS satellite. Warm Start: Where the receiver has a GPS almanac to aid the acquisition of satellite signals by greatly reducing the uncertainty in satellite Doppler and therefore number of frequency cells that must be searched. In this case, the number of frequency cells that must be searched is determined by the accuracy of the GPS local oscillator. For a typical oscillator accuracy of one ppm, the frequency search can be accomplished in less than 10 seconds. In this case, the major time bottleneck for generating a position fix is the time required to acquire the 900 bits of the Satellite Data Message for each GPS satellite that is to be used in computing the receiver position. This Message is broadcast every 30 seconds at 50 bps. For parallel GPS receiver channels, the time requirement to obtain the 900 bit Message from each in-view satellite is roughly 30 seconds.

Hot Start: Where the receiver already has the Satellite Data Messages for all the in-view GPS satellites (7200 bits for eight satellites). In this case, the major time bottleneck is the acquisition of multiple satellite signals and generating pseudorange measurements from them (steps 6 and 7 above). The condition of a GPS receiver is "hot" if it recently (minutes) traversed the steps 1–5 above, or if it received the Satellite Data Messages from an alternate source. From a not start, position determination begins at steps 6 and 7. This can be accomplished quite rapid if a pseudorange measurement is utilized to calibrate out and the frequency uncertainty of the GPS receiver oscillator, thereby enabling the rapid acquisition of subsequent satellite signals with a search over only a single frequency cell. Thus, from a hot start, it is possible to achieve a position fix very rapidly (in less than one second) if a search algorithm is used that minimizes the required frequency search band for signal acquisition.

This invention merges GPS position location and wireless data communication technologies to achieve a precise position location via GPS in the urban canyon and other line-of-sight obstructed environments. A multi-channel GPS receiver with the capability to simultaneously track (and make pseudorange measurements with) all in-view GPS satellites is used in conjunction with an algorithm that makes maximum use of all a priori information about the GPS receiver (its oscillator bias, its location, its knowledge of time) and the ephemeris and time models of the GPS constellation received by a wireless data communication channel or link to enable rapid acquisition of the GPS signal.

As shown above, currently, there are two time bottlenecks in estimating accurate position via GPS. One of these is due to the oscillator bias of the GPS receiver which is a driver for a time consuming search over many frequency cells.

According to the invention, the search over frequency is required only for the acquisition of the first GPS satellite. The frequency measurement from tracking that one satellite is then used to calibrate out the frequency bias of the GPS local oscillator. Thus, the subsequent acquisition of other GPS satellite signals can be accomplished very rapidly because the number of frequency cells that must be searched is reduced to one.

The second time bottleneck in determining precise position location is the necessity to read the 900 bit GPS Satellite Data Message block containing the ephemeris and satellite clock models of the GPS satellites. This data message must be extracted for each satellite that is used for the GPS position solution. Extracting this needed information for determining position will take 30 seconds in a clear environment; in an obstructed environment, extracting this information may take far longer, and in the worst case, may not be possible at all.

According to the invention, this is supplied to the GPS receiver with the needed ephemeris and satellite clock information via an independent wireless data channel such as can be supported by an RDS FM broadcast or a cellular telephone channel. With a cellular telephone, the needed data can be supplied by calling (or receiving a call from) a service center and establishing a data link via a modem in the cellular phone.. and a modem to a service center. The required GPS satellite information is then supplied via the established data link. At typical modem speeds (300 bps to 19.6 Kbps), this information is supplied in only several seconds to less than one second, depending upon the modem speed. In this manner, the GPS is assisted in rapid signal acquisition and rapid determination of position, even in obstructed environments.

In addition to an improved algorithm for rapidly determining position via GPS in an obstructed environment, this invention also solves the problem of establishing the required data link with the GPS receiver. The primary method discussed herein utilizes a mobile cellular phone channel to support a data and a voice channel at the same time. According to the invention, this is accomplished by taking a frequency notch (say 600 Hz, for example) out of the audio band and embedding a data channel in this notch. A 300 bps half-duplex channel can be achieved via a frequency shift keyed (FSK) system with two tones in the frequency notch. With the appropriate notch filter, the participants in the voice conversation hear no modem tones associated with the transfer of data. Preferably, the notch filtering is digitally implemented. There is of course some degradation to the voice quality, depending upon the size and shape of the frequency notch, and its center location. For example, with a notch placed between 1500 Hz and 2100 Hz, voice intelligibility is excellent, and voice recognition is good. With such a frequency notch, a 300 bps "data-in-voice" modem with FSK tones at 1650 Hz and 1959 Hz can be implemented.

DESCRIPTION OF THE DRAWING

The above and other objects advantages and features of the invention will become more apparent when considered with the following specifications and accompanying drawings wherein.

DETAILED DESCRIPTION OF THE INVENTION

Figures 1, 2:
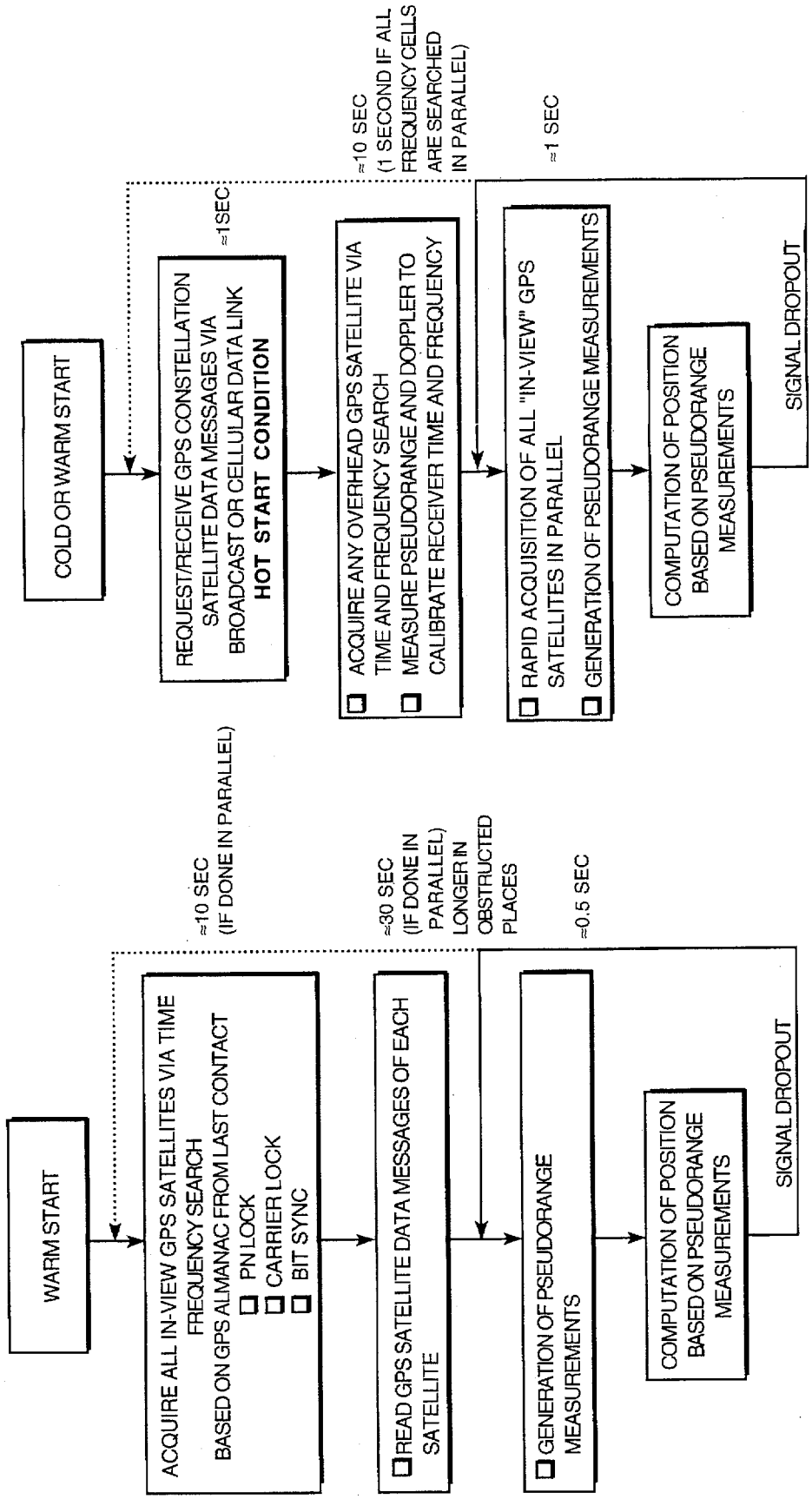
FIG. 1 is a chart illustrating prior and warm start sequence of events in a GPS system.
FIG. 2 is a chart illustrating the warm start sequence according to the invention.

FIG. 1 illustrates the sequence of events and the time requirements to estimate the position via a typical GPS receiver from a warm start. From a warm start, the first step in the process is the reading the GPS Satellite Data Messages contained in the broadcast signals of each satellite. This proceeds with the acquisition of the signals from all in-view satellites (which may take up to 10 seconds). Acquisition begins with PN code acquisition and proceeds to move through the processes of detection confirmation, PN tracking, frequency locked loop pull-in, conversion to phase lock for data demodulation, followed by bit and frame synchronization. Within 40 seconds after a warm start, the receiver will typically have extracted the necessary satellite ephemeris and clock data in the Satellite Data Message of each satellite (i.e., if no obstructions are presented). For a receiver that is presented with obstructions, the time required to collect the necessary data can be quite long. GPS data is transmitted in 1500 bit frames at 50 bits per second. Thus, each frame is transmitted in 30 seconds. The 1500 bit frame of each broadcast is composed of five subframes of 300 bits length. The first three subframes of a broadcast signal (900 bits) comprise the Satellite Data Message for the broadcasting satellite. The Satellite Data Message contains precise ephemeris and time model information for that satellite. The first three subframes are identically repeated in each 1500 bit frame, except that the information is updated periodically. The fourth and fifth subframe contain a part of the almanac which contains coarse ephemeris and time model information for the entire GPS constellation. The contents of the fourth and fifth subframes change until the entire almanac is sent. The repetition period of the fourth and fifth subframes is 12½ minutes and so the entire GPS almanac is contained in 15,000 bits. The subframes are composed of 10 words of 30 bits length with Hamming (32, 26) parity concatenation across words. This means that the last two bits of the previous word are part of the 26 bits used to compute a six bit syndrome. Therefore, it is necessary to receive all 32 bits of each word without interruption.

The invention removes the two greatest time bottlenecks discussed above in determining position via the GPS system. One bottleneck is eliminated by providing the GPS receiver with the needed Satellite Data Messages of the GPS constellation via an external data link supported by the cellular channel. The Satellite Data Messages for eight in-view satellite will be contained in 7200 bits or less; thus, with an external link at data rates from 300 bps up to 19.2 Kbps, the time required to transfer the needed Satellite Data Messages will take from several seconds to only a fraction of a second. The second bottleneck that the invention eliminates is the time required to acquire the signal from subsequent satellites after the first satellite is acquired. It accomplishes this by an algorithm that optimally using GPS ephemeris and time model data together with the Doppler measurement on a single satellite signal to calibrate the GPS receiver frequency reference and thereby reduce the frequency uncertainty (and therefore the time required) for acquisition of subsequent satellite signals.

FIG. 2 illustrate the general strategy and algorithm for a GPS receiver capable of rapid acquisition. While the embodiment discussed herein assumes an eight-channel receiver capable of simultaneously tracking all "in-view" GPS satellites, it is clear that more satellites could be used. The start of any position determination via GPS is normally the acquisition of the signal from the "in-view" GPS satellites in order to read the Satellite Data Messages. However, in this case, the current Satellite Data Message of the GPS constellation are first requested and received via an independent link such as a data link supported by the cellular telephone system. As soon as the first satellite is acquired, the pseudorange and Doppler are measured. Using the Doppler information from this measurement allows Subsequent satellites to be rapidly and reliably acquired and reacquired as the mobile host vehicle progresses through obstructed fields of view.

According to the invention, at the acquisition from a warm start-up, the receiver's oscillator offset is the dominant factor in determining the frequency error of uncertainly ($f_e$) of a broadcast GPS satellite signal. The GPS receiver has either a user-entered, or integral timing function, which is accurate to $t_e$. Using this local time value, the receiver employs a GPS satellite almanac which was previously collected, or was injected via a data port to estimate which GPS satellite is most directly overhead. This computation produces an estimate of the line-of-sight Doppler offset of the GPS L1 carrier frequency relative at the fixed at the location of the GPS receiver. The frequency search aperture is the sum of error in this line-of-sight Doppler offset estimate, the Doppler offset due to motion of the user vehicle, and the offset of the GPS receiver local oscillator scaled to the L1 carrier frequency. For a t of one minute, the error in the estimated offset will typically be about 60 Hz. If the user velocity is assumed to be less than 30 meters per second, this will produce an additional 76 Hz frequency uncertainty. (With the velocity vector principally in the local tangent plane, its contribution to the search aperture is 150 Hz times the cosine of the elevation angle to the satellite which presumably is above 60 degrees, thus reducing the offset by half.) The crystal oscillator is presumed to have a one ppm accuracy, giving an offset of ±1580 Hz when scaled to the L1 frequency. This results in a total frequency uncertainty of roughly ±1700 Hz around the computed Doppler offset.

The C/A code can be searched at a rate of 1000 chip timing hypotheses per second per correlator per channel for a detection probability of 0.95 and a false alarm probability of 0.01 assuming a 40 dB-Hz C/kT. Typically, triple correlator (early, punctual, and late) spacing is 1.5 chips or less. Thus a specific C/A signal can be searched in one Doppler bin of 500 Hz width in one second or less. There are seven bins in the 3500 Hz frequency uncertainly band (each 500 Hz wide) thereby requiring a total search time of seven seconds to acquire the first signal. However, if an eight-channel receiver is used to acquire a chosen overhead GPS satellite, all frequency cells can be searched simultaneously and the satellite signal can be acquired in one second. Upon acquisition of the signal, the signal is tracked, and a measurement of pseudorange and Doppler is obtained. This convergence requires less than 4 seconds.

This Doppler measurement is then used to collapse the frequency uncertainty in acquisition of subsequent satellite signals by calibrating the GPS local oscillator against the Doppler measurement. The acquisition frequency uncertainty band is then reduced to the sum of the uncertainties of the ephemeris data and the vehicle Doppler, or less than a few hundred Hz. Consequently, subsequent satellite signal acquisitions can be accomplished in only one second via a search over only a single 500 Hz frequency cell. Thus, with an eight-channel receiver, all in-view satellites can be acquired in parallel in only one second, and pseudorange measurements can be generated in an additional ½ second. Until the data frames from at least one GPS satellite are read, the above measurements contain a time-range ambiguity equal to the period of the PN code (1 msec-300 km). If time framing for only one satellite signal is established, this time-position ambiguity is resolved. As mentioned above, reading the required data frames on the broadcast signal will require roughly 30 seconds. However, this time bottleneck can be avoided as long the a priori position uncertainty is sufficiently small to resolve the ambiguity. The requirement will, in general, depend upon the GDOP of the in-view GPS constellation, but it is clear that the assumed a priori assumption of 10 km will be more than sufficient to resolve the ambiguity. Thus, position location is possible without ever taking the time to read the GPS data. In summation, with the invention that starts with providing the GPS receiver with the needed Satellite Data Messages via an external data link, the position may be determined in less than three seconds.

Figure 3:
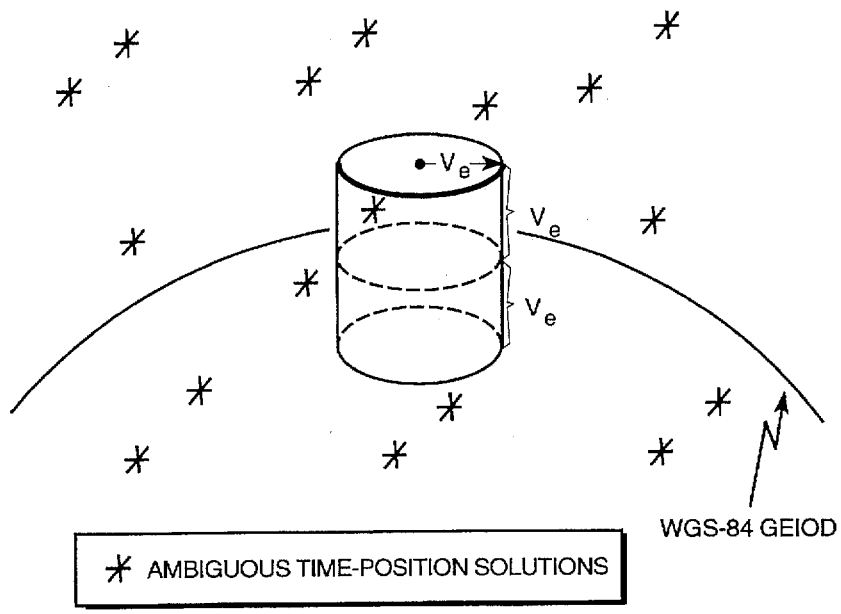
FIG. 3 is a schematic illustration of how a priori knowledge of position resolves the ambiguity in time-position.

FIG. 3 illustrates how the a priori knowledge of position resolves the ambiguity in time-position. It pictures a cylindrical start-up position uncertainty volume of height 2 v and radius $r_e$. Here, $v_e$ denotes a bound on the uncertainty in altitude relative to the WGS-84 geoid and $r_e$ denotes a bound on the radial uncertainty in position from a known point in the plane tangent to the geoid. At start-up, the receiver is somewhere within this uncertainty cylinder, and the receiver's software assumes that it is located at the center of the cylinder. The uncertainty cylinder determines the ability of the a priori position knowledge to resolve the time-position ambiguity of the GPS receiver. In the worst case situation, the uncertainty cylinder will result in an uncertainty corresponding to a distance of $v_e^2+r_e^2$. If one assumes a value of 10 km for this quantity, the resulting local clock uncertainty will be about 30 microseconds. In general, based upon pseudorange measurements with the in-view satellites, there will be a number of GPS receiver time-position pairs that are consistent with these pseudorange measurements). However, only those solutions contained inside the position uncertainty cylinder and the time uncertainty window (one minute assumed) can be real solutions. And it is clear that as long as the uncertainty cylinder is not large, there will only be one time-position pair in this region so that the solution is unique and the ambiguity is resolved.

Figure 4:
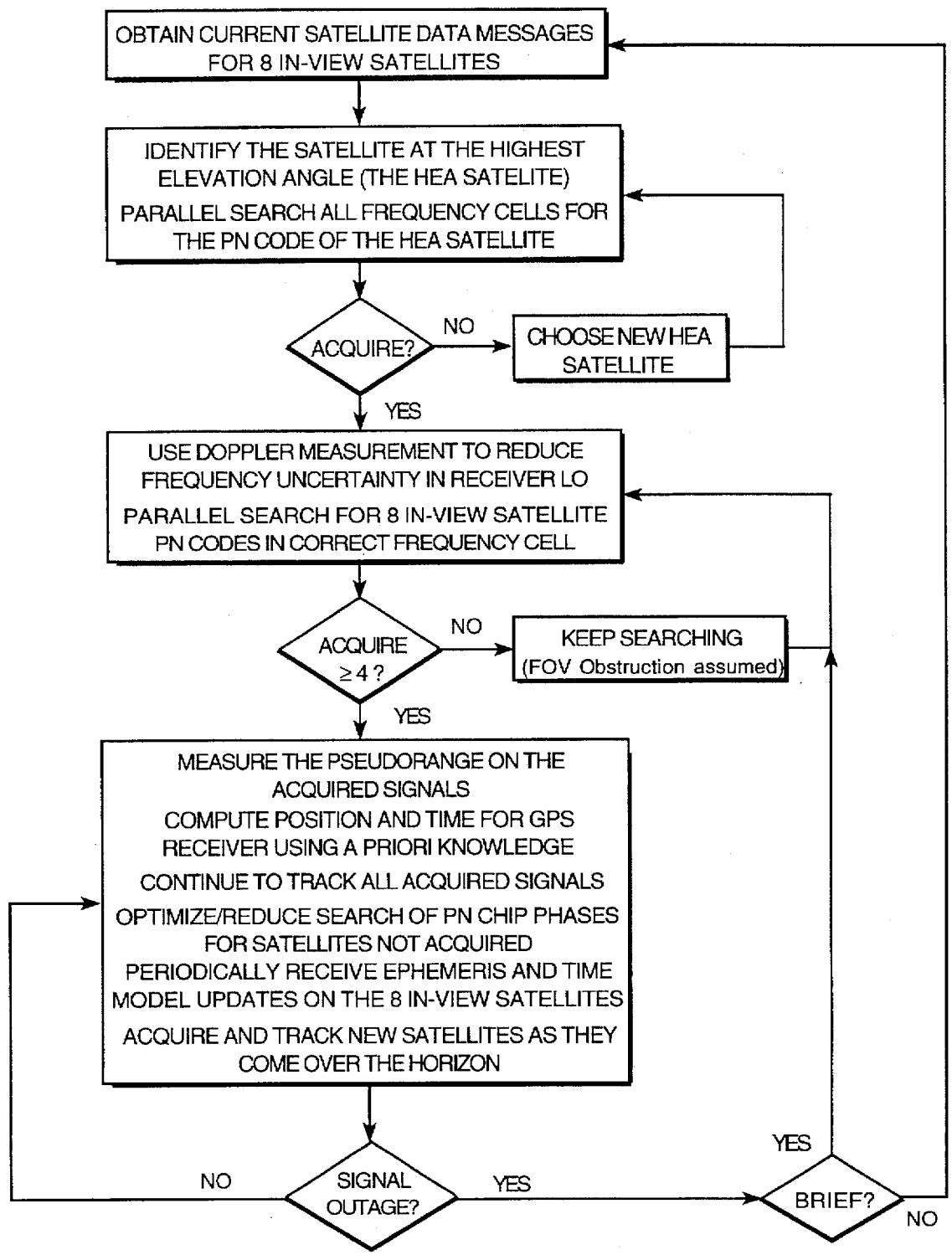
FIG. 4 is a flow chart of signal processing according to the invention.

Subsequent to resolving the time ambiguity of the GPS receiver, acquiring satellites can be further aided by the reduced time as well as frequency uncertainties. With a one ppm GPS receiver clock drift, time can be maintained to better than 60 microseconds, even with the receiver outages lasting up to one minute. Thus, the required PN search to acquire a satellite can be reduced to a search over less than 100 C/A code chip positions. The frequency uncertainty is still much less than a 500 Hz cell. Thus, it should be possible to acquire subsequent satellite signals in 0.1 seconds by searching 100 code chip phases in a single frequency bin. A measurement of pseudorange using code phase under condition of frequency lock can be made in an additional 0.5 seconds. Thus, once the GPS receiver time and frequency are calibrated, it is possible to acquire and generate pseudorange measurements from multiple satellite signals in parallel in less than one second. Thus, in this reacquisition mode, the time required for position location is indeed quite short. In situations where signals are obstructed by tall structures except at the crossroads, this is the only way that a GPS position fix can be generated. The search process for multiple satellite signals is repeated endlessly, and acquisition of multiple satellite signals will occur whenever the view to multiple satellites is unobstructed. The detailed logic of the algorithm for rapid GPS signal acquisition is illustrated in FIG. 4.

Figure 5:
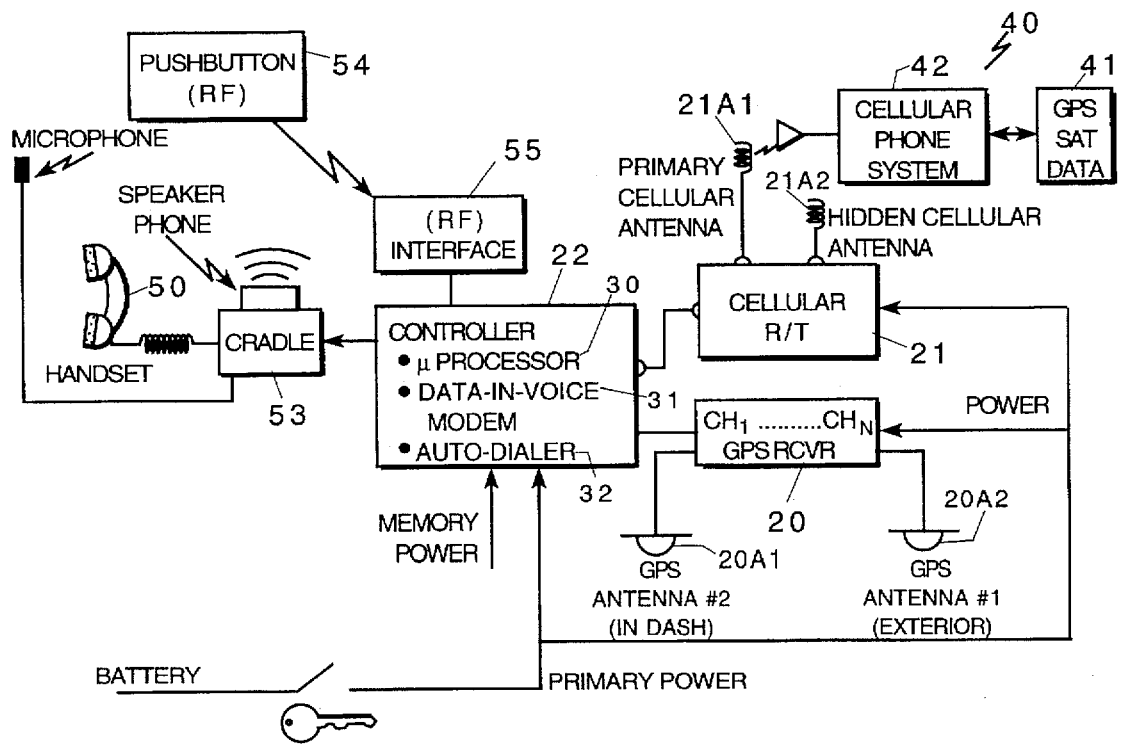
FIG. 5 is a block diagram of GPS receiver combined with a cellular telephone and a controller according to the invention.

FIG. 5 illustrates a preferred embodiment or configuration which includes a GPS receiver 20 combined with a cellular telephone 21, having a primary cellular antenna 21A1 and a hidden parallel cellular antenna 21A2 that is capable of supporting the rapid acquisition capability of the GPS signals, and rapid determination of position. The GPS receiver 20 has an in-dash antenna 20A1 and a roof or exterior antenna 20A2 and a plurality of parallel channels CH ... CHn for independent attempts at acquiring multiple (sight in this embodiment) satellites simultaneously. This is required since it is important that the acquisition process for the first satellite can search the entire frequency uncertainty region in parallel. Given that the state-of-the-art oscillators for GPS receivers have a frequency accuracy of about one ppm, this requires at least seven parallel channels to encompass the frequency uncertainty band. When oscillator frequency accuracy improves, then the preferred number of parallel channels can be reduced. The eight-channel receiver is also important for rapid acquisition in parallel of all in-view satellites. With an eight-channel receiver, all in-view satellite signals will be searched for; thus as long as the line-of-sight to a given in-view satellite is not blocked, its signal will be typically acquired in less than one second with a rapid acquisition receiver. The GPS receiver 20 is under the control of the controller element 22 shown in FIG. 5, which includes a microprocessor controller 30, "data-in-voice" modem 31 (see FIG. 6), and autodialer 32.

The first step in using the unit to determine the position via GPS would be for the controller to acquire the Satellite Data Messages for the in-view GPS satellites. In one embodiment, this is provided by intercepting a broadcast signal such as the RDS in the FM radio band, or by calling a service center 40 and establishing data link with a compatible modem. The current ephemeris and time models of the GPS satellite constellation stored in the GPS satellite almanac database 41 would then be provided to the unit via that data link—the cellular telephone system 42. This link would also provide GPS correction parameters that support much improved GPS position accuracy when the GPS is in the search and acquisition mode. The controller 22 would thus obtain the Satellite Data Messages of in-view Satellites, and route this data to the GPS receiver 20 where it would be used to support the acquisition of the first overhead satellite, support the subsequent acquisition of all in-view satellites, and calculate the position of the receiver, based upon subsequent pseudorange measurements with these satellites. A memory power is supplied to controller 22 to maintain data stored therein.

The system shown in FIG. 5 also includes a cellular telephone handset 50, a cradle 53, and an RF pushbutton device 54 for theft alarm enable/disable initiation, and the RF interface 55 for that device to controller 22. The handset has all the controls (not shown) needed to initiate and receive calls from the telephone system, but the installed unit in the vehicle acts as relay station to the cellular system 42. The handset 50 serves as the interface for voice input and audio output for the vehicle user. The controller 22 mediates the transmission of voice and data over the common cellular telephone channel. The RF pushbutton device 54 is used to enable/disable a theft reporting function of the vehicle unit. This function is to autonomously initiate a call when a defined theft condition is realized and to accurately relay the vehicle position as determined by the GPS receiver 20.

One example of such condition is whenever the system receives battery power with the theft reporting function in the enabled state. The pushbutton device 54 is packaged in a small keychain type unit similar to those for alarm enable/disable of current vehicle theft alarm equipment.

THE PRESENT INVENTION

In addition to an improved algorithm for rapidly determining position via GPS in an obstructed environment, the present invention also solves the problem of establishing the required data link with the GPS receiver. The primary method of this embodiment utilizes a mobile cellular phone channel to support a data and a voice channel at the same time. This is accomplished by taking a 600 Hz frequency notch out of the audio band and embedding a data channel in this notch. A 300 bps half-duplex channel can be achieved via a frequency shift keyed (FSK) system with two tones in the frequency notch. With the appropriate notch filter, the participants in the voice conversation hear no modem tones associated with the transfer of data. Degradation to the voice quality is low, depending upon the size and shape of the frequency notch, and its center location. It has been found that with a 600 Hz notch placed between 1500 Hz and 2100 Hz, voice intelligibility is excellent, and voice recognition is good. With such a frequency notch, a 300 bps "data-in-voice" modem with FSK tones at 1650 Hz and 1959 Hz can be implemented.

Figure 6:
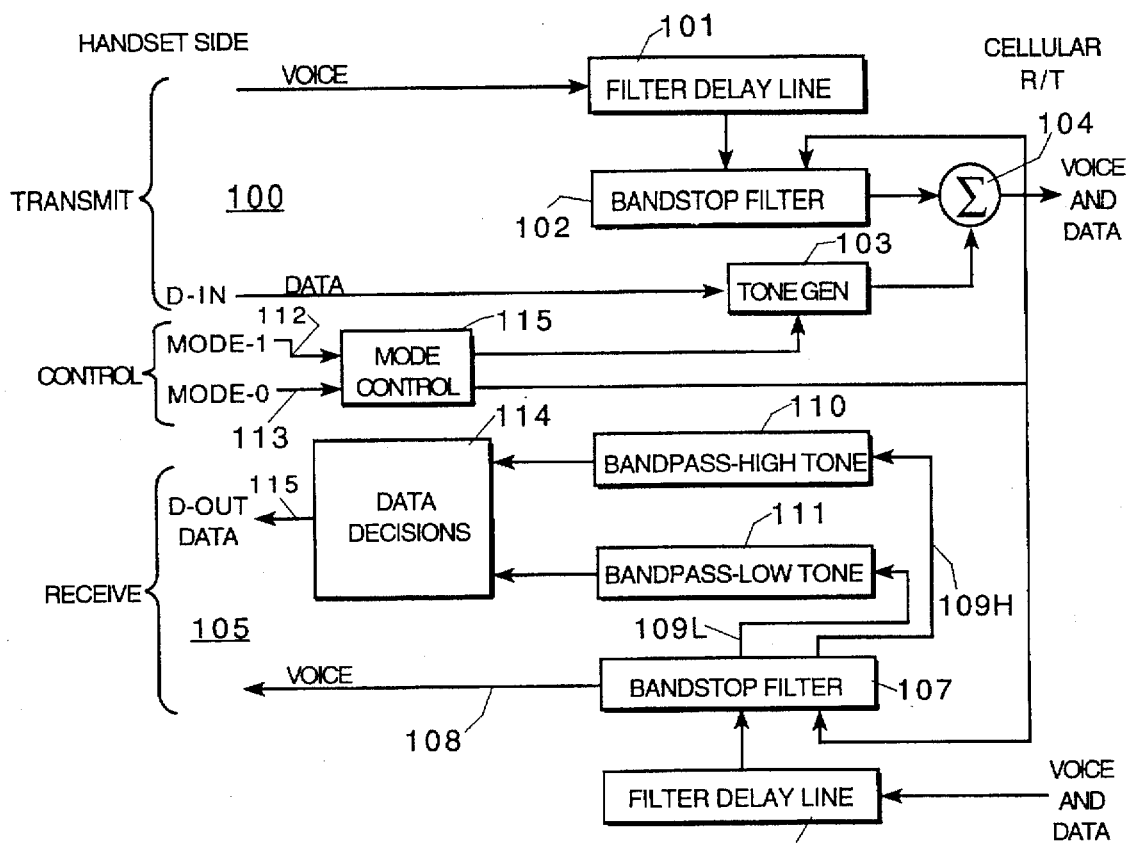
FIG. 6 is a block diagram of the data-in-voice modem according to the invention.

FIG. 6 illustrates the block diagram for the data-in-voice modem contained in controller 22. A digital implementation of this algorithm using a commercially available digital signal processing (DSP) chip is within the scope of this invention. In FIG. 6 note that processing and filtering is implemented on both the transmit and receive channels.

The transmit channel 100 includes filter delay line 101 feeding bandstop filter 102 so that a notch (600 Hz, for example) is subtracted from the voice or audio band and a tone generator 103 inserts the two FSK tones (1650 Hz and 1959 Hz, for example), of the data channel into this notch via summer 104. The receiver channel 105 is similarly filtered by filter delay line 106 and bandstop filter 107 creating separate outputs 108 and 109-H and 109-L of the filtered voice, the high tone bandpass 110, and the low tone bandpass 111. A comparison and smoothing operation on the bandpass signals in the data decisions circuit 114 results in the received data stream 115. In addition to the processing of the transmit and receive channels, the "data-in-voice" modem has two digital inputs 112 and 113 from microprocessor 30 (FIG. 5) for mode control: one enables/disables the channel filtering, and the other toggles the modem between its transmit and receive modes.

In addition to combining data and voice on a single audio channel, the data-in-voice modem 31 (FIG. 6) also samples and compares the incoming and outgoing voice power during hands free operation. In hands-free mode (microphone/speaker phone in FIG. 5), incoming voice is broadcast from the cradle speaker and outgoing voice is picked up by the microphone. One way of avoiding feedback and echoes in this configuration is to severely attenuate one of the voice signals (i.e. the weaker) so that the voice conversation is half duplex. It is important to do this attenuation on the audio signals before the transmit data has been put on (for the outgoing audio), and after the receive data has been stripped off for the incoming audio. By implementing the processing in this manner the data-in-voice modem is fully compatible with hands-free operation of the cellular telephone: that is, data transfer will not be affected by the voice conversation, and neither will the voice conversation be affected by data transfer.

This system for combining data and voice on the same cellular telephone channel is advantageous in that there is (1) blanking of the voice channel, (2) no audible tones to the users involved in a voice conversation, and (3) little degradation to speech quality.

Figure 7A:
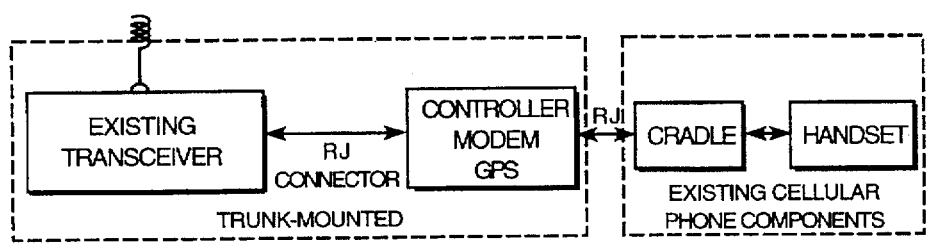
FIG. 7a is a block diagram of a configuration for the invention that interfaces with existing cellular phone equipment that may already be installed in the vehicle.
Figure 7B:
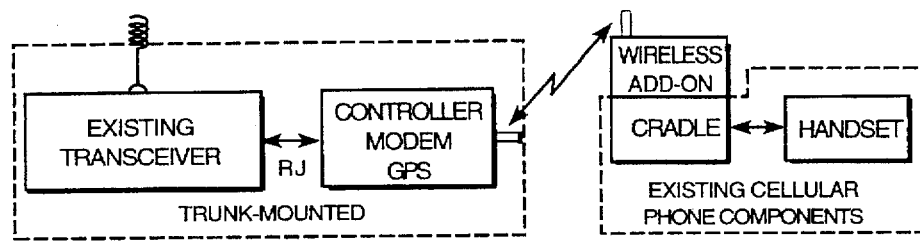
FIG. 7b illustrates how this can be done with a wireless connection.

Configurations for retrofitting existing cellular phones with the invention are shown in FIGS. 7a and 7b. As diagrammatically illustrated in FIGS. 7a and 7b, a trunk mounted cellular phone transceiver unit and controller, model and GPS unit is coupled to the existing cellular phone components by a RJ cable, whereas in FIG. 7b, they are coupled by an RF link. The retrofit configuration shown in FIG. 7b requires a conventional wireless add link between the trunk mounted components and the existing cellular phone components (cradle and handset) in the passenger compartment of the vehicle.

What is claimed is:

1. A modem for use in a cellular mobile subscriber telephone in a cellular telephone system having one or more cell sites servicing a plurality of cellular mobile subscriber telephones, said modem comprising a transmit channel and a receive channel, each of said channels having first filter means to receive voice signals and second filter means to transmit voice signals on said transmit channel, said second filter means having only one frequency notch in said transmit and receive channels; an interface for receiving binary data from a source of G.P.S. data; means to transmit said binary data from said source within said only one frequency notch, and mode control means for selectively enabling said source of binary data and said only one frequency notch to allow data to be transmitted.

2. The modem defined in claim 1 wherein said binary data is constituted by a plurality of frequency shift keyed (FSK) tones and said FSK tones are about 1650 Hz and about 1959 Hz, respectively.

3. The modem defined in claim 1 wherein said second filter means in said transmit and receive channels are digital filters.

4. The modem defined in claim 1 wherein said modem is mounted in the trunk of a vehicle, and said cellular mobile telephone is coupled to said modem by a radio link.

5. In a position location system wherein a plurality of radio stations transmit time and location data over radio frequency signals which enable a mobile position location receiver on the ground to determine its position and generate location data signals, the improvement comprising:

said mobile position location system including a modem, said modem including a transmit portion which receives voice data, and a tone generator for receiving data for transmission, a bandstop filter for providing a frequency notch in said voice channel, summer means connected to said tone generator and said bandstop filter for combining said location data signals with said voice data and;

receive portion having a filter delay line for receiving combined voice and data signals on said modem, a bandstop filter for extracting the data signals, and a data decisions circuit connected to the bandstop filter for comparing and smoothing said data signals; and a digital mode control means for selectively controlling said bandstop filters in said transmit and receive portions of said modem.

6. A modem for use in a subscriber telephone in a cellular telephone system having one or more cell sites servicing a plurality of subscriber telephones with data utilization devices, said modem comprising transmit and receive channels, said receive channel comprising a first filter delay line to receive voice and data signals, a first bandstop filter for transmitting a voice input to said subscriber telephones and data signals to said data utilization devices, respectively; said transmit channel having a second filter delay line connected to receive voice signals from said cellular telephone, a second bandstop filter connected to said filter delay line for providing a frequency notch in said voice signals from said cellular phones; an interface for receiving; of binary data from a source of G.P.S. data; and means for converting to binary data from said source of binary data to tone signals and for transmitting said tone signals within said frequency notch and; control means for converting for selectively controlling said first and second bandstop filters to allow data to be transmitted and received in said transmit and receive channels, respectively.

\* \* \* \* \*